Figure 1:
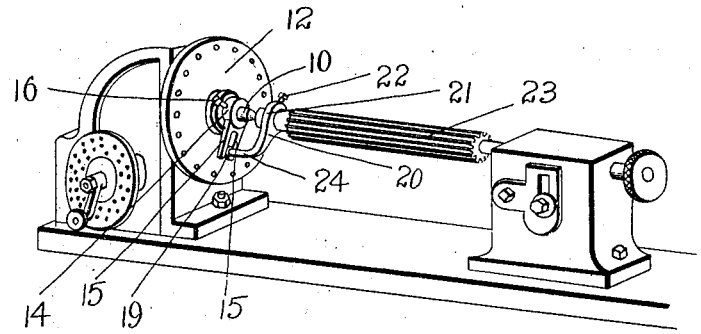

No. 768,454. PATENTED AUG. 23, 1904.
M. B. HILL.
MACHINE DOG.
APPLICATION FILED DEC. 27, 1901.
NO MODEL.

Witnesses:
C. F. Wesson.
F. H. Lincoln.

Inventor:
Milton B. Hill.
By Aldus C. Higgins,
Attorney.

No. 768,454.

Patented August 23, 1904.

UNITED STATES PATENT OFFICE.

MILTON B. HILL, OF WORCESTER, MASSACHUSETTS.

MACHINE-DOG.

SPECIFICATION forming part of Letters Patent No. 768,454, dated August 23, 1904.

Application filed December 27, 1901. Serial No. 87,456. (No model.)

*To all whom it may concern:*

Be it known that I, MILTON B. HILL, a citizen of the United States of America, and a resident of the city of Worcester, county of Worcester, Commonwealth of Massachusetts, have invented certain new and useful Improvements in Machine-Dogs, of which the following is a specification.

My invention relates to machine-dogs such as are adapted for use in the lathe or milling-machine.

The common machine-dog is attached to the work which is mounted on the centers of the machine and is provided with means consisting usually of an extension or tail which engages with the face-plate or chuck. Thus the work is driven in the centers for turning, grinding, milling, and other machine operations. In plain cylindrical and taper turning in the lathe it is not usually necessary that the tail should be held rigidly to the face-plate, it being sufficient to provide a bearing on the face-plate necessary to drive it; but for certain work this means has very obvious disadvantages, and it frequently becomes necessary to clamp or set the dog to the face-plate, so that there shall be no play or motion on the axis of revolution between the work and the face-plate. It has therefore been customary to hold the tail to the face-plate or chuck by means of set-screws, clamps, or wedges. This means, however, has very marked disadvantages. In the first place such means holds the tail rigid with the face-plate, so that it has no motion independent thereof. It is essential in the revolution of taper work in milling-machines for the tail to move radially and transversely with relation to the face-plate; but it should be held from moving in either direction on the axis of revolution. It is owing to the fact that the plane of the face-plate and the plane of revolution are not parallel and the tail is continually changing its position in the plane of the face-plate during its revolution that a radial and transverse movement must be provided for. In cases where movement of the work in the plane of revolution must be made with the face-plate without lost motion—as, for example, in the grinding or milling of a fluted taper reamer—it has been customary to set the tail rigidly to the face-plate or chuck by means of a set-screw or other clamping device. The force with which this set-screw is clamped on the tail of the dog is liable to affect the accuracy of the work by springing it out of true, particularly if the tail of the dog is not square with its bearing in the face-plate. The force with which the set-screw is clamped up and the nature of its bearing on the tail is apt to affect the accuracy of the work. The use of the set-screw also results in the bruising of the tail of the dog, and each change in position requires manipulation.

The object of my invention is to hold the work to the face-plate without independent movement on the axis of revolution, at the same time allowing for transverse and radial movement.

To this end my invention consists in a dog having an attachment to the face-plate by a joint permitting free movement in all directions, save on the axis of revolution of the face-plate.

Figure 2:
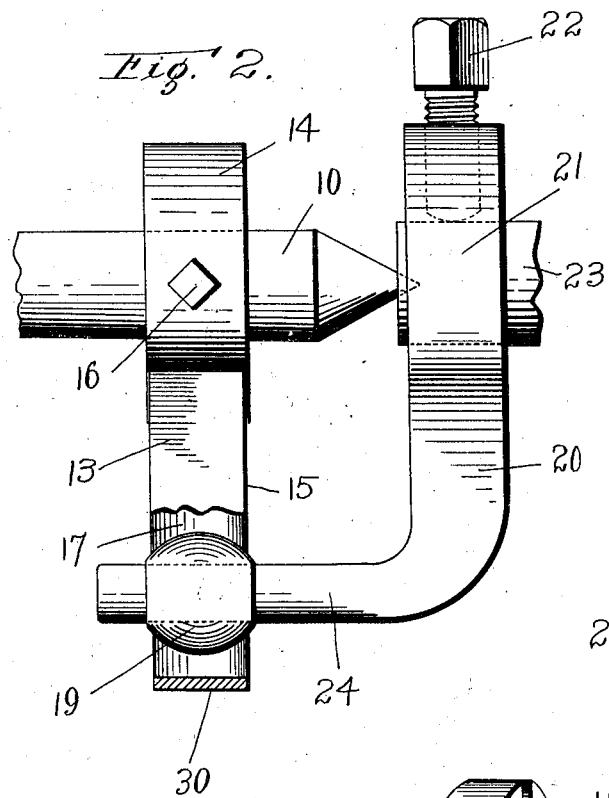
Figure 3:
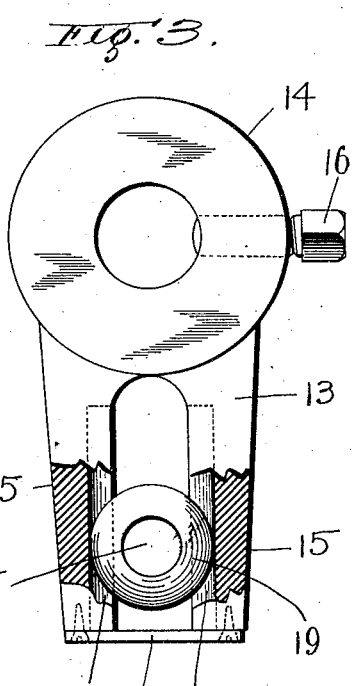
Figure 4:
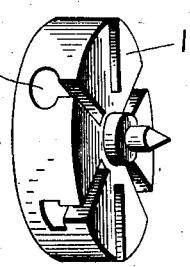

Figure 1 is a perspective view of a milling-machine table, showing my dog attached to a reamer. Fig. 2 is an elevation, partly in section, showing my dog attached to the work mounted on the head-center. Fig. 3 is an elevation, partly in section, taken at right angles to Fig. 2. Fig. 4 is a perspective view of the face-plate adapted to receive the ball forming the universal joint.

The center 10 is the ordinary lathe or milling-machine center, and to the spindle in which this center is mounted is usually attached the face-plate or chuck 11 of the lathe, as shown in Fig. 4, or in case of the milling-machine the face-plate 12, as shown in Fig. 1. This face-plate may be adapted to my invention, as will hereinafter be described, or a special chuck 13 may be used, as shown in Figs. 1 and 2. This chuck comprises the hub 14 and bifurcated extension 15 and is attached to the center by the set-screw 16. The said bifurcated extension is provided with the curved tracks 17 18 on its inner faces, said tracks being adapted to receive and to fit the ball 19. Said ball is adapted to move parallel to the axis of revolution and to turn in its track. The dog

20 has the usual hub 21 and set-screw 22, adapted to clamp on the work 23. It is provided with the extension or tail 24. This extension is made round and fits the hole 25 in the ball 19 and is adapted to slide in said hole.

Instead of the chuck 13 the ordinary face-plate of the lathe, as 11, can be provided with the circular track 26, as shown in Fig. 4, in which the ball would slide, as in case of the chuck 13. The ball is held from dropping out of the tracks when the dog is removed by the plate 30, fastened to the ends of the bifurcated extensions.

It will be seen that the dog will allow a great variation in the angle of the axis of revolution of the head-center with that of the work and still hold the work to revolve with said center without lost motion. At the same time the dog can be removed with the same freedom, as in the case of the ordinary dog, and is not subject to attachment with any clamping device whatever to the face-plate.

Having described my invention, what I claim, and desire to secure by Letters Patent, is—

1. The combination with the dog, of a face-plate and a joint between the same, said joint comprising means whereby said dog may be moved in any direction independent of the face-plate save around its axis of revolution.

2. The combination with a dog, of a face-plate having a track, a ball slidable in said track, and a tail slidable in said ball.

3. The combination with the dog, of a face-plate or chuck, of a radial socket in said plate, and a ball slidable in said socket and slidably engaging the tail of said dog, whereby the movement of the dog is independent of the face-plate except on the axis of revolution.

Signed by me at Worcester this 9th day of December, 1901.

MILTON B. HILL

Witnesses:
ALDUS C. HIGGINS,
F. H. LINCOLN.